US011164063B2

(12) United States Patent
Geissinger et al.

(10) Patent No.: US 11,164,063 B2
(45) Date of Patent: Nov. 2, 2021

(54) MULTILAYER STACK INCLUDING RFID TAG

(71) Applicant: 3M INNOVATIVE PROPERTIES COMPANY, St. Paul, MN (US)

(72) Inventors: John D. Geissinger, Austin, TX (US); Donald G. Peterson, Shoreview, MN (US); Robin E. Gorrell, Round Rock, TX (US); Howard M. Kaplan, Oak Park, CA (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/919,323

(22) Filed: Jul. 2, 2020

(65) Prior Publication Data

US 2020/0334512 A1 Oct. 22, 2020

Related U.S. Application Data

(62) Division of application No. 16/662,592, filed on Oct. 24, 2019, now Pat. No. 10,740,669, which is a
(Continued)

(51) Int. Cl.
*G06K 7/08* (2006.01)
*G06K 19/06* (2006.01)
(Continued)

(52) U.S. Cl.
CPC ..... *G06K 19/07722* (2013.01); *G06K 19/025* (2013.01); *G06K 19/077* (2013.01);
(Continued)

(58) Field of Classification Search
CPC ....... G06K 19/07722; G06K 19/07718; G06K 19/077; G06K 19/07783; G06K 19/025;
(Continued)

(56) References Cited

U.S. PATENT DOCUMENTS 4,369,557 A 1/1983 Vandebult
5,088,483 A 2/1992 Heinecke
(Continued)

FOREIGN PATENT DOCUMENTS

EP 0821406 1/1998
EP 2214183 8/2010
(Continued)

OTHER PUBLICATIONS

Kim, "Epidermal Electronics," Science, Aug. 2011, vol. 333, No. 6044, pp. 838-843.
(Continued)

*Primary Examiner* — Tuyen K Vo
(74) *Attorney, Agent, or Firm* — Clifton F. Richardson

(57) ABSTRACT

A multilayer stack includes a first stretchable layer having a first length, a first adhesive layer disposed on a top surface of the first stretchable layer and having the first length, a second stretchable layer disposed on a top surface of the first adhesive layer and having a second length smaller than the first length, a radio frequency identification tag including an antenna having a spiral form and disposed on a top surface of the second stretchable layer or on a bottom surface of the second stretchable layer, a second adhesive layer disposed on the second stretchable layer and having a third length less than the first length and greater than the second length where the second adhesive layer encapsulates the second stretchable layer, and a third stretchable layer disposed on a top surface of the second adhesive layer and having the third length.

10 Claims, 7 Drawing Sheets

Related U.S. Application Data division of application No. 15/500,148, filed as application No. PCT/US2015/042171 on Jul. 27, 2015, now Pat. No. 10,496,915.

(60) Provisional application No. 62/031,603, filed on Jul. 31, 2014.

(51) Int. Cl.
| | |
|---|---|
| *G06K 19/077* | (2006.01) |
| *H01Q 1/38* | (2006.01) |
| *H01Q 1/36* | (2006.01) |
| *H01Q 1/22* | (2006.01) |
| *G06K 19/02* | (2006.01) |

(52) U.S. Cl.
CPC . *G06K 19/07718* (2013.01); *G06K 19/07728* (2013.01); *G06K 19/07773* (2013.01); *G06K 19/07783* (2013.01); *H01Q 1/2225* (2013.01); *H01Q 1/36* (2013.01); *H01Q 1/38* (2013.01); *G06K 19/0776* (2013.01)

(58) Field of Classification Search
CPC ....... G06K 19/07728; G06K 19/07773; G06K 19/0776; H01Q 1/38; H01Q 1/36; H01Q 1/2225
USPC .................................................. 235/451, 492
See application file for complete search history.

(56) References Cited

U.S. PATENT DOCUMENTS

| | | | |
|---|---|---|---|
| 5,738,642 | A | 4/1998 | Heinecke |
| 6,160,526 | A | 12/2000 | Hirai et al. |
| 6,407,669 | B1 | 6/2002 | Brown |
| 6,693,541 | B2 | 2/2004 | Egbert |
| 7,969,307 | B2 | 6/2011 | Peeters |
| 2004/0026921 | A1* | 2/2004 | Krone ........................ G09F 3/02 283/92 |
| 2004/0103808 | A1 | 6/2004 | Lochun |
| 2005/0133131 | A1 | 6/2005 | Starinshak |
| 2006/0043199 | A1 | 3/2006 | Baba |
| 2008/0224940 | A1 | 9/2008 | Sugiyama |
| 2008/0301936 | A1 | 12/2008 | Van De Ven |
| 2009/0032602 | A1 | 2/2009 | Nishi |
| 2009/0295542 | A1* | 12/2009 | Hioki ..................... B31D 1/021 340/10.1 |
| 2010/0039232 | A1 | 2/2010 | Chang |
| 2010/0045347 | A1* | 2/2010 | Lee .......................... H03K 5/08 327/82 |
| 2011/0114734 | A1 | 5/2011 | Tiedmann |
| 2011/0302770 | A1 | 12/2011 | Radeene |
| 2012/0248201 | A1* | 10/2012 | Sutera ............... G06K 19/07728 235/492 |
| 2013/0041235 | A1 | 2/2013 | Rogers |
| 2013/0245388 | A1 | 9/2013 | Rafferty |
| 2013/0297301 | A1 | 11/2013 | Albert |
| 2014/0002325 | A1 | 1/2014 | Matsushita |
| 2014/0097944 | A1 | 4/2014 | Fastert |
| 2015/0144702 | A1* | 5/2015 | Mei .................. G06K 19/07722 235/488 |
| 2016/0006123 | A1 | 1/2016 | Li |

FOREIGN PATENT DOCUMENTS

| | | |
|---|---|---|
| JP | 08-129630 | 5/1996 |
| JP | H11-011059 | 1/1999 |
| WO | WO 2014-015917 | 1/2014 |
| WO | WO 2016-018585 | 2/2016 |

OTHER PUBLICATIONS

Son, "Multifunctional Wearable Devices for Diagnosis and Therapy of Movement Disorders," Nature Nanotechnology, May 2014, vol. 9, pp. 397-404.

Warmann, "Google: Motorola's Tattoos could Replace Passwords," [retrieved from the internet on Aug. 1, 2014], URL < http://www.telegraph.co.uk/technology/mobile-phones/10090863/Google-Motorolas-tattoos-could-replace-passwords.html> 4 pages.

International Search Report for PCT International Application No. PCT/US2015/039925, dated Oct. 27, 2015, 5 pages.

International Search Report for PCT International Application No. PCT/US2015/042171, dated Mar. 21, 2016, 7 pages.

* cited by examiner

MULTILAYER STACK INCLUDING RFID TAG

BACKGROUND

Radio frequency identification (RFID) tags can be used for authentication. It may be desired to attach electronics that can be used for authentication to human skin. However, conventional RFID antennas may not provide sufficient flexibility for use in an RFID tag attached to human skin or may be prone to breaking when subject to the flexing or stretching associated with skin movement.

SUMMARY

In some aspects of the present description, a radio frequency identification tag is provided that includes a flexible substrate having opposite major top and bottom surfaces, an antenna having a spiral form disposed on the top surface of the substrate and having a length between first and second ends, a first terminal disposed at and in electrical communication with the first end of the antenna, a second terminal disposed at and in electrical communication with the second end of the antenna, and a pad portion along the length of the antenna between the first and second ends for mounting an integrated circuit. The pad portion is in electrical communication with the antenna, such that except for the pad portion, a radius of curvature of the antenna along at least 90 percent of a length of the antenna between the first and second ends is greater than about 0.1 mm and less than about 10 mm.

In some aspects of the present description, a radio frequency identification tag is provided that includes a flexible substrate, and an antenna having a plurality of substantially concentric loops disposed on a major surface of the flexible substrate and forming a plurality of first zones and a plurality of second zones. Each first zone includes a plurality of concentric first arcs and each first arc in the plurality of first zones has a same first arc angle in a range from about 60 degrees to about 120 degrees. Each second zone includes a plurality of concentric second arcs and each second arc in the plurality of second zones has a same second arc angle in a range from about 160 degrees to about 200 degrees.

In some aspects of the present description, a radio frequency identification tag is provided that includes a flexible substrate, and an antenna having a plurality of substantially concentric loops disposed on a major surface of the flexible substrate and including a plurality of middle loops between innermost and outermost loops. Each middle loop includes alternating concave and convex portions, and a radius of curvature along at least 90 percent of a length of the middle loop is in a range from about 0.1 mm to about 4 mm.

In some aspects of the present description, a film assembly is provided that includes a stretchable substrate having opposite major top and bottom surfaces, a first material disposed on the major top surface of the stretchable substrate in the form of a plurality of intersecting rows and columns making the film assembly less stretchable than the stretchable substrate. The rows and columns define a plurality of closed cells, and an antenna for use in a radio frequency identification tag is disposed on the stretchable substrate in each closed cell and isolated from the first material. The antenna includes an elongated electrically conductive electrode having a spiral form.

In some aspects of the present description, a multilayer stack is provided that includes a first stretchable layer having a first length, a first adhesive layer disposed on a top surface of the first stretchable layer and having the first length, a second stretchable layer disposed on a top surface of the first adhesive layer and having a second length smaller than the first length, a radio frequency identification tag including an antenna having a spiral form and disposed on a top surface of the second stretchable layer or on a bottom surface of the second stretchable layer, and a second adhesive layer disposed on the second stretchable layer and having a third length less than the first length and greater than the second length. The second adhesive layer encapsulates the second stretchable layer. The multilayer stack also includes a third stretchable layer having the third length disposed on a top surface of the second adhesive layer.

DETAILED DESCRIPTION

Figure 1:
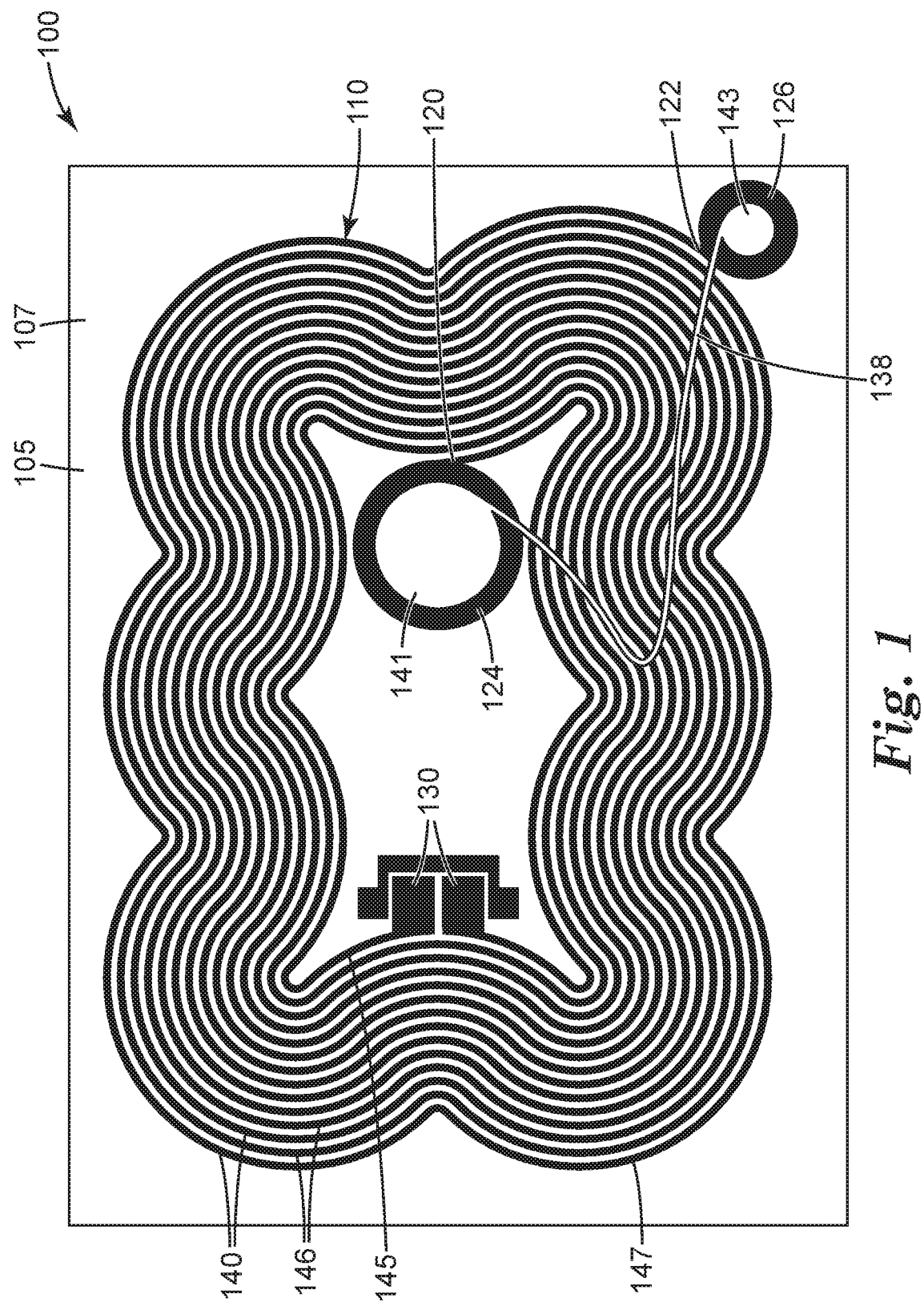
FIG. 1 is a top view of an RFID tag.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

As used herein, layers, components, or elements may be described as being adjacent one another. Layers, components, or elements can be adjacent one another by being in direct contact, by being connected through one or more other components, or by being held next to one another or attached to one another. Layers, components, or elements that are in direct contact may be described as being immediately adjacent.

It is sometimes desired to attach electronics to human skin. Such electronics includes radio frequency identification (RFID) tags that can be used to authenticate a user. For example, a person could attach an RFID tag to their skin which could then automatically provide the necessary authentication via near field communication (NFC) to an NFC-enabled computer, tablet, phone, or the like that the person may use. RFID tags may include an antenna that includes a coil. When incorporated onto a flexible substrate attached to skin, conventional coil designs may break at stress concentration points along the coil. For example, a conventional coil may include substantially rectangular arrangements of copper traces which can have high stress concentration near the corners when stretched. According to the present description, RFID tags are provided that can stretch and conform to human skin without breaking. Such an RFID tag may include an antenna having a spiral geometry as described herein which allows the antenna to flex and stretch without being prone to damage.

FIG. 1 shows a top view of a radio frequency identification (RFID) tag 100 that includes a flexible substrate 105 having a top surface 107 and an opposing bottom surface, an antenna 110 having a spiral form disposed on the top surface 107 of the flexible substrate 105 and having a first end 120 and a second end 122, a first terminal 124 disposed at and in electrical communication with the first end 120 of the antenna 110, a second terminal 126 disposed at and in electrical communication with the second end 122 of the antenna, and a pad portion 130 along the length of the antenna 110 between the first end 120 and the second end 122 for mounting an integrated circuit. In some embodiments, the pad portion 130 is in electrical communication with the antenna 110, such that except for the pad portion 130, a radius of curvature of the antenna along at least 90 percent (or at least 95 percent, or at least 98 percent or substantially all) of a length of the antenna between the first end 120 and the second end 122 is greater than about 0.1 mm or greater than about 0.12 mm and less than about 10 mm, or less than about 8 mm, or less than about 6 mm, or less than about 5 mm, or less than about 4 mm, or less than about 3.5 mm. In some embodiments, the pad portion 130 is not disposed along the length of the antenna 110, but, as discussed in greater detail elsewhere, may instead be incorporated into a connector used to connect first terminal 124 and second terminal 126. In the illustrated embodiment, RFID tag 100 includes a connector 138 having first end 141 attached to first terminal 124 and having second end 143 attached to second terminal 126. Connector 138 may be a wire, for example.

In some embodiments, the flexible substrate 105 is stretchable. In some embodiments, the flexible substrate 105 includes polyurethane. In some embodiments, flexible substrate 105 is a polymeric film. Suitable polymer films include elastomeric polyurethane, co-polyester, or polyether block amide films.

The antenna 110 includes a plurality of substantially concentric loops 140 which include a plurality of middle loops 146 disposed between an innermost loop 145 and an outermost loop 147. In some embodiments, the radius of curvature of each middle loop 146 along at least 90 percent, or at least 95 percent, or at least 98 percent or substantially all of an entire length of the middle loop 146 is greater than about 0.1 mm or greater than about 0.12 mm and less than about 10 mm, or less than about 8 mm, or less than about 6 mm, or less than about 5 mm, or less than about 4 mm, or less than about 3.5 mm. In some embodiments, each middle loop includes alternating concave and convex portions. In some embodiments, a radius of curvature along at least 90 percent of a length of the middle loop is in a range from about 0.1 mm to about 4 mm. In some embodiments, the radius of curvature along substantially all of the length of the middle loop is in a range from about 0.1 mm to about 4 mm.

The geometry described for antenna 110 may apply to the antenna of any embodiment described herein. The antenna of any RFID tag of the present description may include convex portions adjacent concave portions. A radius of curvature may be said to be within a specified range over substantially all of a specified length if the radius of curvature is within the specified range over all of the specified length except possibly for transition regions between adjacent concave and convex zones. In some embodiments, each transition region has a length less than 1 percent or less than 2 percent of the length of the antenna or less than 1 percent or less than 2 percent of the length of an outermost loop of the antenna.

Antennas suitable for use in RFID tags of the present description can be made by laminating a metallic foil onto a substrate. For example, a copper foil or an aluminum foil and a polymer film, such as a polyurethane film, can be heat laminated together. In other embodiments, a material is extruded directly onto a metallic foil forming a substrate layer attached to the metallic foil. For example, a polyurethane resin may be extruded onto a copper foil. In other embodiments, a material, such as a urethane, is solvent coated onto a metallic foil. Once the metallic foil has been attached to a substrate or once a substrate layer has been formed on the metallic foil, the metallic foil may then be patterned using conventional wet etching techniques to produce a spiral antenna disposed on a major surface of the substrate. The metallic foil may have a thickness in the range of about 2 microns, or about 10 microns, to about 30 microns, or to about 50 microns, and the substrate may have a thickness in the range of about 10 microns to about 50 microns, or to about 100 microns, or to about 125 microns.

Figure 2:
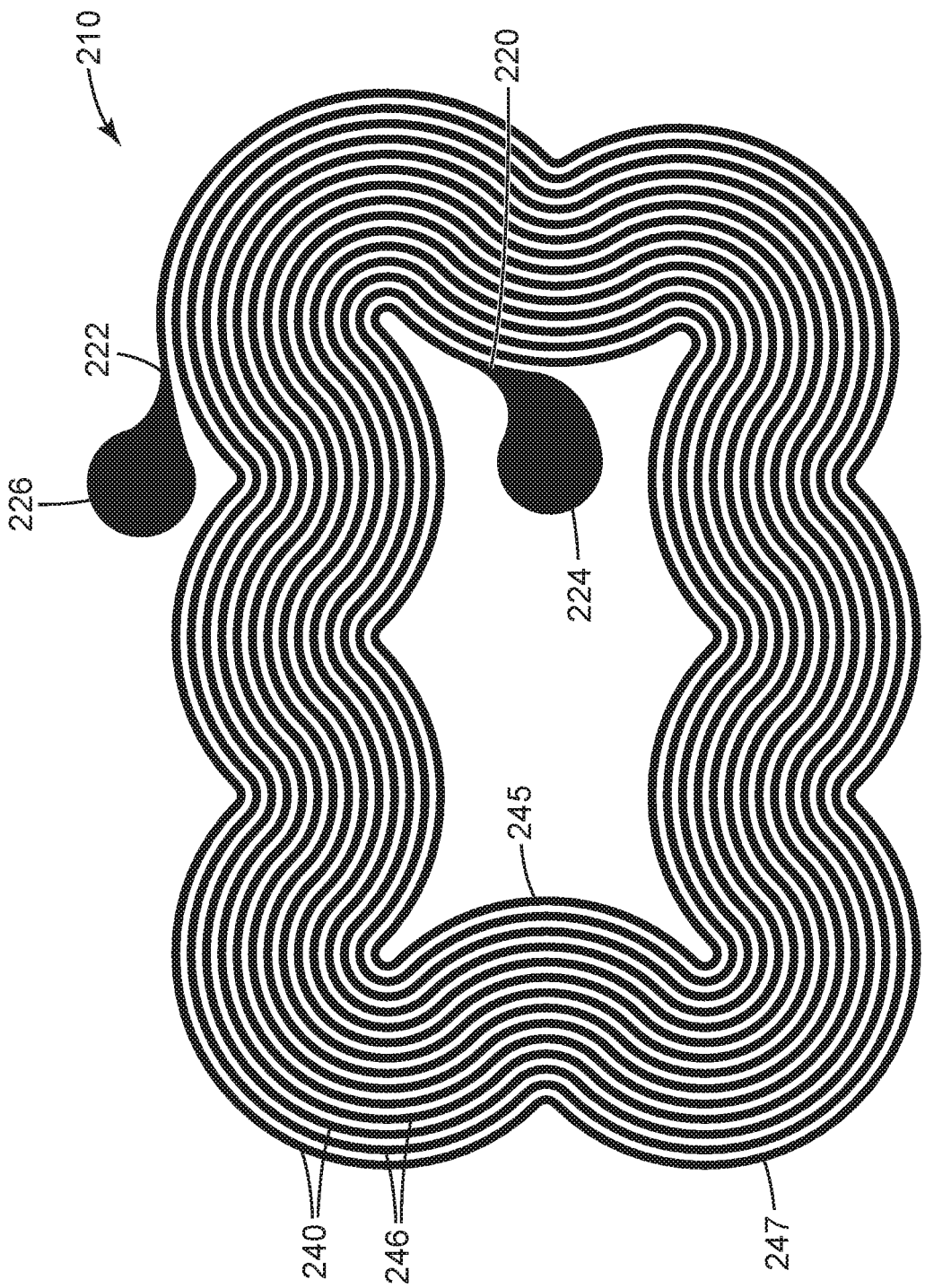
FIG. 2 is a top view of an antenna.

An antenna 210 suitable for use in RFID tags of the present description is shown in FIG. 2. Antenna 210 includes a first end 220 and a second end 222, a first terminal 224 disposed at and in electrical communication with the first end 220 of the antenna 210, a second terminal 226 disposed at and in electrical communication with the second end 222 of the antenna 210. The antenna 210 includes a plurality of substantially concentric loops 240 which include a plurality of middle loops 246 disposed between an innermost loop 245 and an outermost loop 247. In some embodiments, the radius of curvature of each middle loop 246 along substantially all of an entire length entire length of the middle loop 246 is greater than about 0.1 mm and less than about 10 mm. In some embodiments, each middle loop includes alternating concave and convex portions. In some embodiments, a radius of curvature along at least 90 percent of a length of the middle loop is in a range from about 0.1 mm to about 4 mm. In some embodiments, the radius of curvature along substantially all of the length of the middle loop is in a range from about 0.1 mm to about 4 mm.

Figure 3:
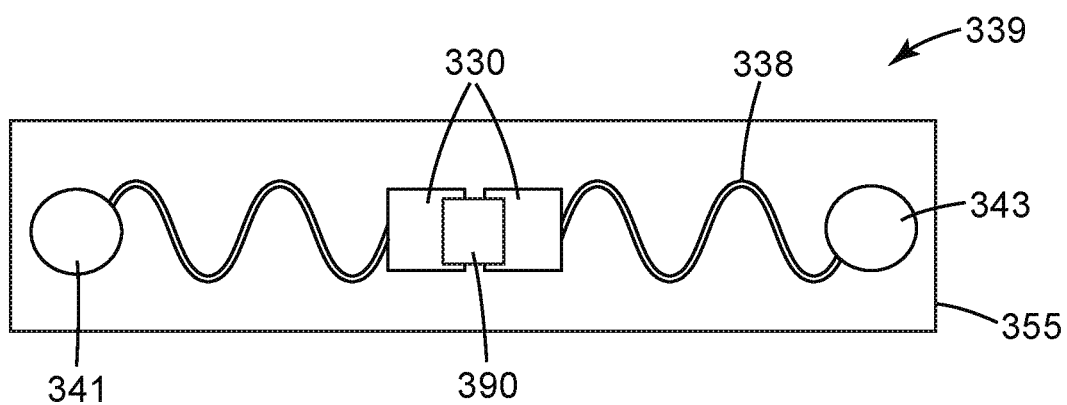
FIG. 3 is a top view of a connector.

A connector may be used to connect first terminal 224 and second terminal 226. FIG. 3 shows connector 339 which includes electrode 338 having first end 341 and second end 343 disposed on a major surface of a substrate 355. In some embodiments, the connector 339 includes pad portions 330 for mounting an integrated circuit 390. In some embodiments, except for the pad portion 330, a radius of curvature of the electrode 838 along at least 90% or 95% or 98% of the length between first end 841 and second end 843 is greater than about 0.1 mm and less than about 10 mm. In some embodiments, the electrode 338 may be substantially sinusoidal. Connectors useful with the RFID tags of the present description are also described in commonly assigned U.S. Prov. Pat. App. Ser. No. 62/031,581 entitled "RFID TAG ON STRETCHABLE SUBSTRATE", filed on an even date herewith, and hereby incorporated herein by reference in its entirety.

Figure 4B:
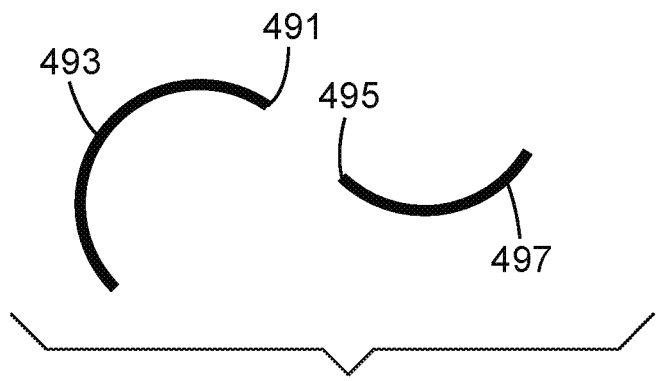
FIGS. 4B-4C are top views of portions of an antenna.
Figure 4C:
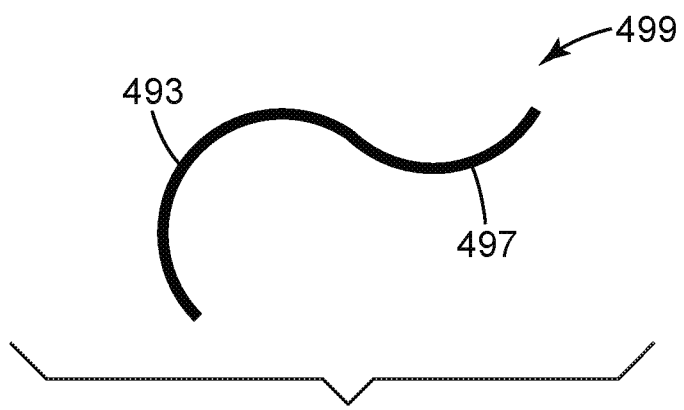
Figure 4A:
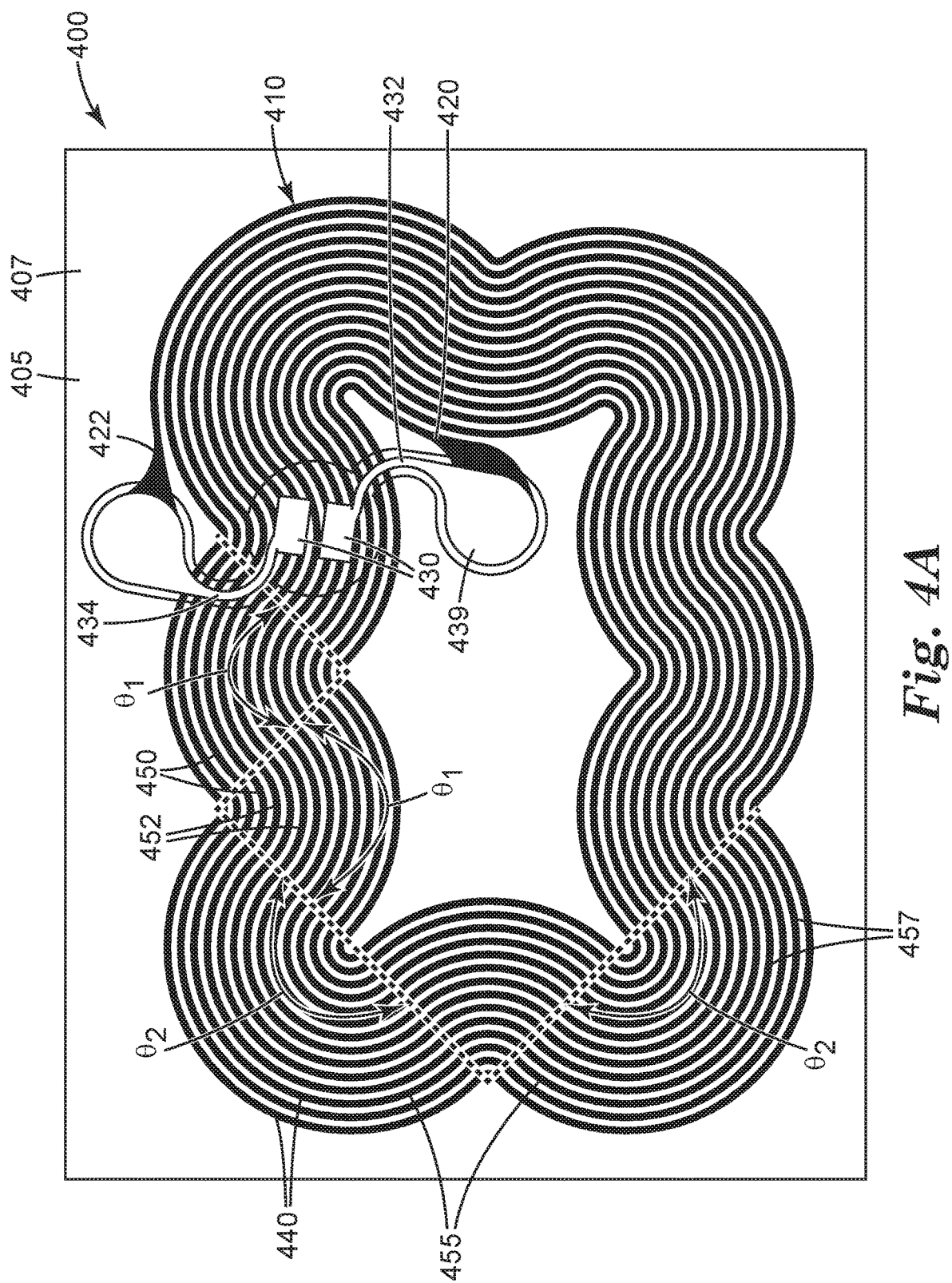
FIG. 4A is a top view of an RFID tag.

FIG. 4A shows an RFID tag 400 that includes a flexible substrate 405 having a top surface 407 and an opposing bottom surface, an antenna 410 having a spiral form disposed on the top surface 407 of the flexible substrate 405 and having a first end 420 and a second end 422, a first terminal 424 disposed at and in electrical communication with the first end 420 of the antenna 410, a second terminal 426 disposed at and in electrical communication with the second end 422 of the antenna. In some embodiments, a pad portion is included along the length of the antenna 410 between the first end 420 and the second end 422 for mounting an integrated circuit, while in other embodiments, no pad portion is included along the length of the antenna 410. In the embodiment illustrate in FIG. 4A, RFID tag 400 includes a connector 439 which includes pad portion 430 for mounting an integrated circuit and includes circuits 432 and 434 which connect pad portion 430 to first and second ends of the connector 439.

A plurality of first zones 450 and a plurality of second zones 455 formed by the substantially concentric loops 440 are indicated. Each first zone 450 includes a plurality of concentric first arcs 452. In some embodiments, each first arc in the plurality of first zones has a same first arc angle $\theta_1$ in a range from about 60 degrees to about 120 degrees, or in a range from about 70 degrees to about 110 degrees, or in a range of about 80 degrees to about 100 degrees. Each second zone 455 includes a plurality of concentric second arcs 457. In some embodiments, each second arc in the plurality of second zones has a same second arc angle $\theta_2$ in a range from about 150 degrees to about 210 degrees, or in a range from about 160 degrees to about 200 degrees, or in a range of about 170 degrees to about 190 degrees. In some embodiments, the first arc angle $\theta_1$ is about 90 degrees and the second arc angle $\theta_2$ is about 180 degrees.

In some embodiments, a radius of curvature of each first and each second arc 452 and 457 along substantially all of the entire length of the arc is in a range from about 1 mm to about 5 mm. The geometry described for the antenna 410 of RFID tag 400 may apply to any of the antennas described herein. For example, antenna 210 of FIG. 2 may have a geometry as described for antenna 410 except for the pad portion of antenna 410 is not present in antenna 210.

In some embodiments, an end of each arc in each zone in the pluralities of first and second zones is connected to an end of an arc in a different zone in the pluralities of first and second zones to form a combined arc. For example, an end 491 of an arc 493 in the plurality of second zones 455 may be connected to an end 495 of an arc 497 in the plurality of first zones 450 to form a combined arc 499 as illustrated in FIGS. 4B-4C. In some embodiments, a radius of curvature of the combined arc along substantially all of the entire length of the combined arc is in a range from about 1 mm to about 5 mm.

Figure 4D:
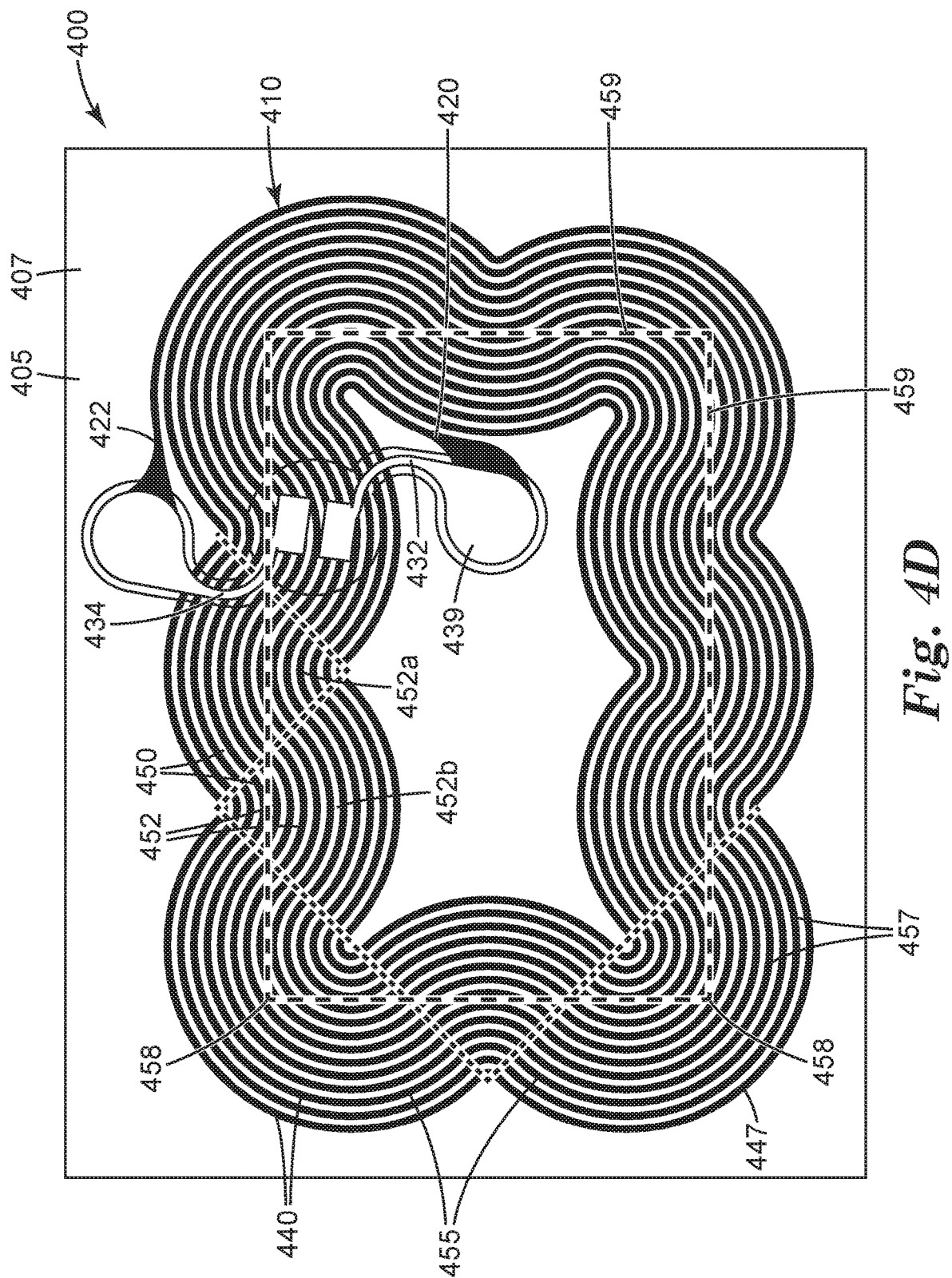
FIG. 4D is a top view of an RFID tag.

In some embodiments, the antenna has a substantially polygonal shape having a plurality of vertices and sides. This is illustrated in FIG. 4D, where the antenna 410 has an approximately rectangular shape including vertices 458 and sides 459. In some embodiments, each first zone 450 is disposed along a side 459 and each second zone is disposed at a vertex 458. In other embodiments, an RFID antenna may have an approximately square or hexagonal or other polygonal shape. A substantially square shape can be made by changing the number of arcs disposed along the sides 459 compared to the embodiment shown in FIG. 4D. A substantially hexagonal or other polygonal shape can be made by changing the number of vertices 458 and changing the arc angle $\theta_2$ at the vertices 458.

In some embodiments, the concentric first arcs in at least one first zone are concave toward an innermost loop in the plurality of substantially concentric loops, and the concentric first arcs in at least one other first zone are convex toward the innermost loop. For example, referring to FIG. 4D, first arc 452a is concave toward innermost loop 445 and first arc 452b is convex toward innermost loop 445. In some embodiments, the concentric second arcs in at least one second zone are concave toward an innermost loop in the plurality of substantially concentric loops. For example, second arcs 457 are concave toward innermost loop 445. In some embodiments, the concentric second arcs in each second zone are concave toward an innermost loop in the plurality of substantially concentric loops.

Figure 5:
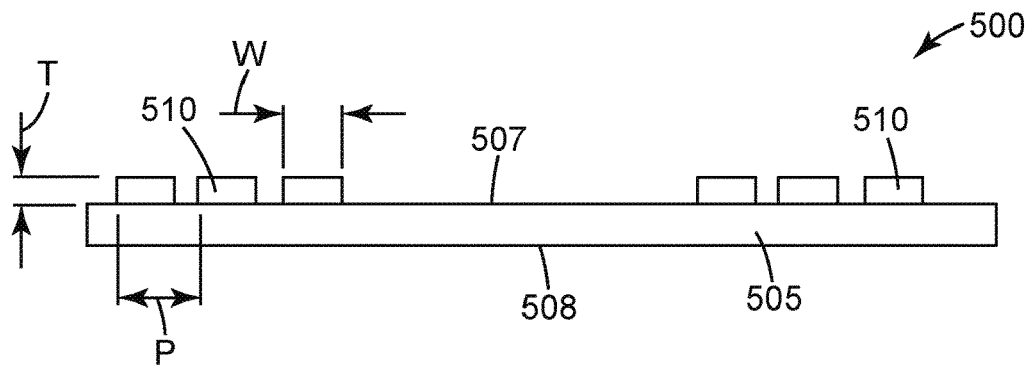
FIG. 5 is a schematic cross-sectional view of an RFID tag.

FIG. 5 show a cross-section of a portion of an RFID tag 500 that includes a flexible substrate 505 having major top surface 507 and opposite major bottom surface 508. Antenna 510 is disposed on major top surface 507. The antenna 510 may include a metal spiral trace that forms a plurality of substantially concentric loops. The antenna 510 may have a thickness T along a direction perpendicular to the flexible substrate 505 that may be in a range from about 2 microns, or about 10 microns, to about 30 microns, or about 50 microns, and a width W that that may be in a range from about 10 microns, or about 50 microns, to about 300 microns, or about 500 microns. The plurality of substantially concentric loops of the antenna may form a pitch P which may be in a range from about 30 microns, or about 75 microns, or about 150 microns, to about 400 microns, or to about 800 microns.

In some embodiments a connector may be included adjacent flexible substrate 505. The connector may include a pad portion for attaching an integrated circuit as illustrated in FIG. 3. In some embodiments, the connector may be adjacent major bottom surface 508 opposite antenna 510. In some embodiments, the connector may be adjacent antenna 510 opposite flexible substrate 505. In some embodiments, an additional dielectric layer or an additional substrate layer may separate antenna 510 and a circuit portion of the connector.

Figure 6A:
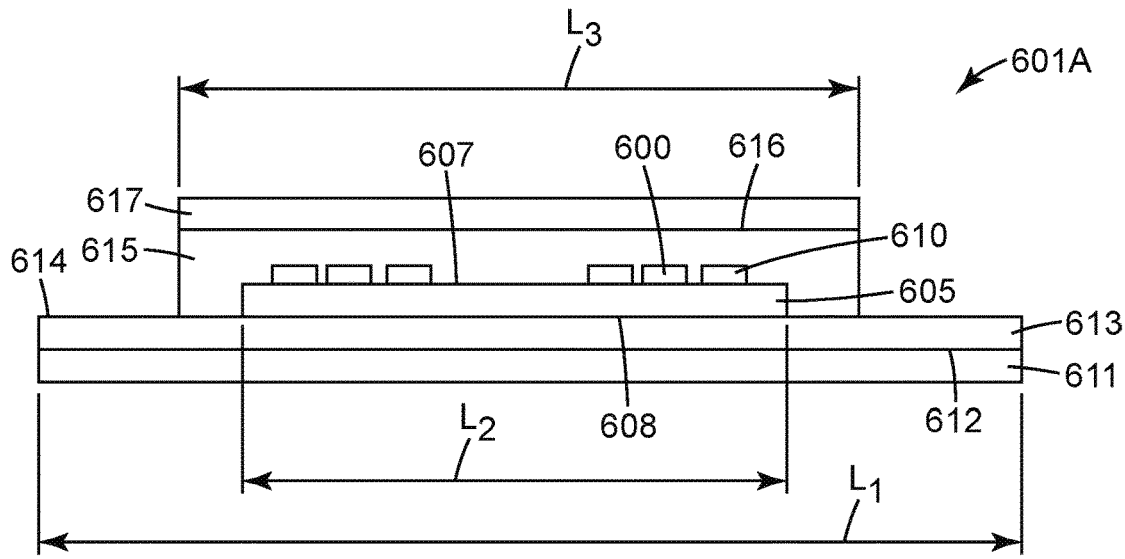
FIGS. 6A-6B are schematic cross-sectional views of multilayer stacks.
Figure 6B:
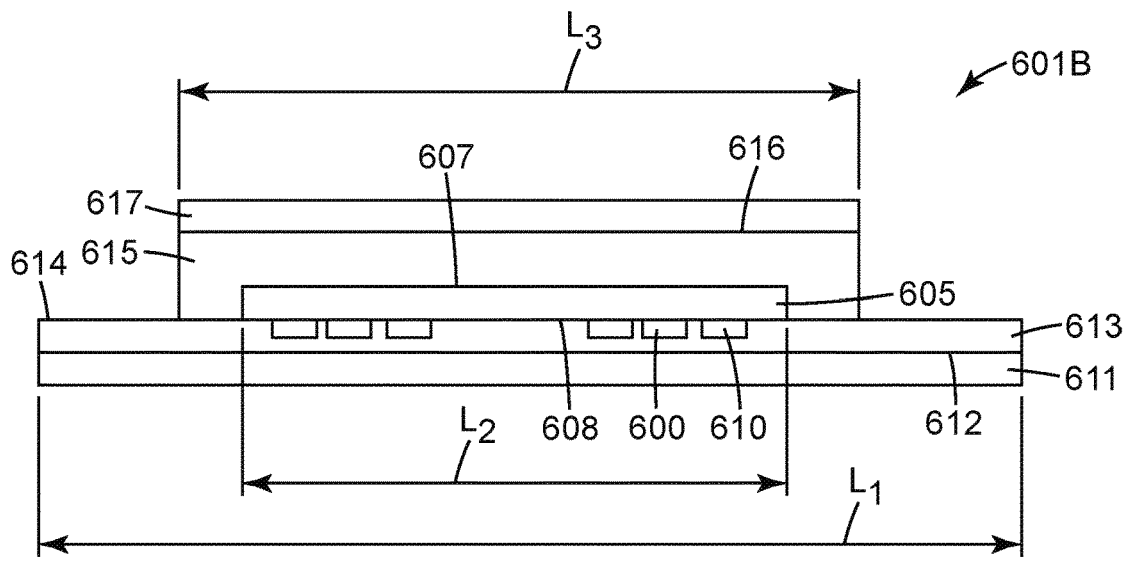

FIG. 6A shows a multilayer stack 601A including a first stretchable layer 611 having a first length $L_1$, a first adhesive layer 613 disposed on a top surface 612 of the first stretchable layer 611 and having the first length $L_1$, a second stretchable layer 605 disposed on a top surface 614 of the first adhesive layer 613 and having a second length $L_2$ smaller than the first length $L_1$, a radio frequency identification tag 600 which includes an antenna 610 disposed on the top surface 607 of the second stretchable layer 605, a second adhesive layer 615 disposed on the second stretchable layer 605 and having a third length $L_3$ less than the first length $L_1$ and greater than the second length $L_2$, and a third stretchable layer 617 disposed on a top surface 616 of the second adhesive layer 615 and having the third length $L_3$. Antenna 610 has a spiral form. The second adhesive layer 615 encapsulates the second stretchable layer 605 and the radio frequency identification tag 600. An alternate embodiment is shown in FIG. 6B where the antenna 610 is disposed on a bottom surface 608 of the second stretchable layer 605 in multilayer stack 601B. In this case, the second adhesive layer 615 encapsulates the second stretchable layer 605 and antenna 610 is encapsulated in first adhesive layer 613. In some embodiments, multilayer stack 601A or 601B includes a connector which may be disposed on adjacent second stretchable layer 605 opposite antenna 610.

In some embodiments, each of the first and second adhesive layers comprises a pressure sensitive acrylate adhesive. In some embodiments, at least one of the first and second adhesive layers comprises a hypoallergenic acrylate copolymer bioadhesive such as those described in U.S. Pat. No. 5,088,483 (Heinecke). Such adhesives are useful when it is desired to attach a multilayer stack that includes an RFID tag to skin. In some embodiments, each of the first, second, and third stretchable layers includes polyurethane. Any of the stretchable substrates of the present description can be a polymeric film. Suitable polymer films include elastomeric polyurethane, co-polyester, or polyether block amide films. For example, each of the first, second and third stretchable layers may be a polyurethane film having a thickness in the range of about 10 microns to about 30 microns.

Figure 7A:
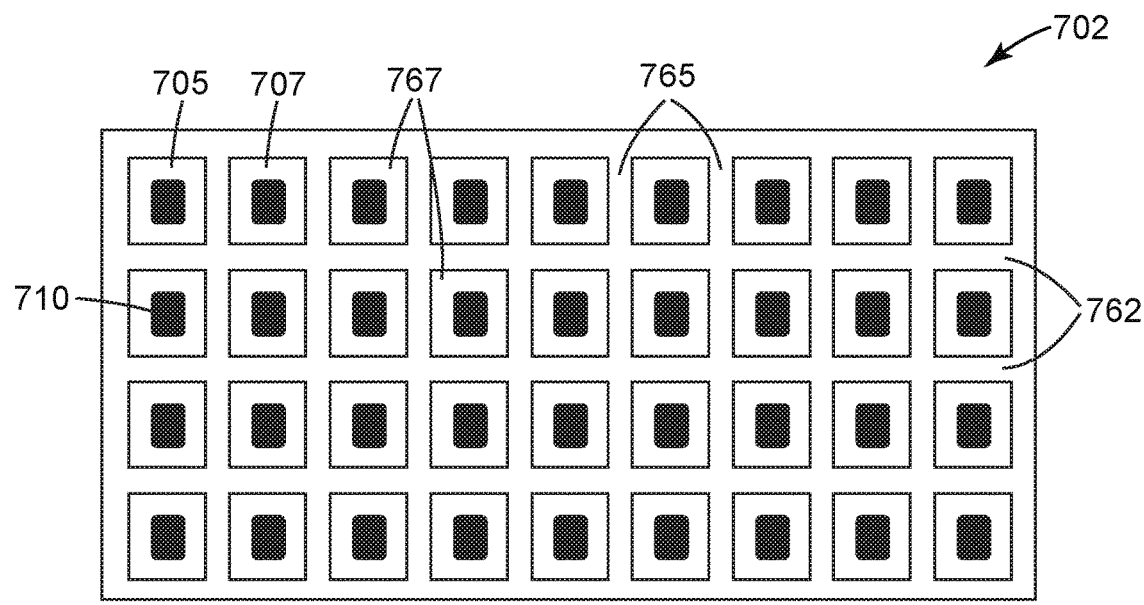
FIG. 7A is a top view of a film assembly.

FIG. 7A illustrates a film assembly 702 that includes a stretchable substrate 705 having a major top surface 707 and an opposing major bottom surface, a first material disposed on the major top surface 707 of the stretchable substrate 705 in the form of a plurality of intersecting rows 762 and columns 765 defining a plurality of closed cells 767. An antenna 710 for use in a radio frequency identification tag is disposed on the stretchable substrate 705 in each closed cell 767 and is isolated from the first material. The plurality of intersecting rows and columns 762 and 765 make the film assembly 702 less stretchable than the stretchable substrate 705. Such an arrangement of rows and columns is useful for large scale manufacturing where the rows and columns add rigidity to the film assembly which helps prevent stretching of the antennas during the manufacturing process. The antenna 710 includes an elongated electrically conductive electrode which may have a spiral form as illustrated in any of FIGS. 1, 2, and 4A, for example. In some embodiments, the first material comprises metal. In some embodiments, the first material is copper, aluminum, or an alloy containing copper or aluminum. Film assembly 702 may be singulated and used to make a plurality of RFID tags.

Figure 7B:
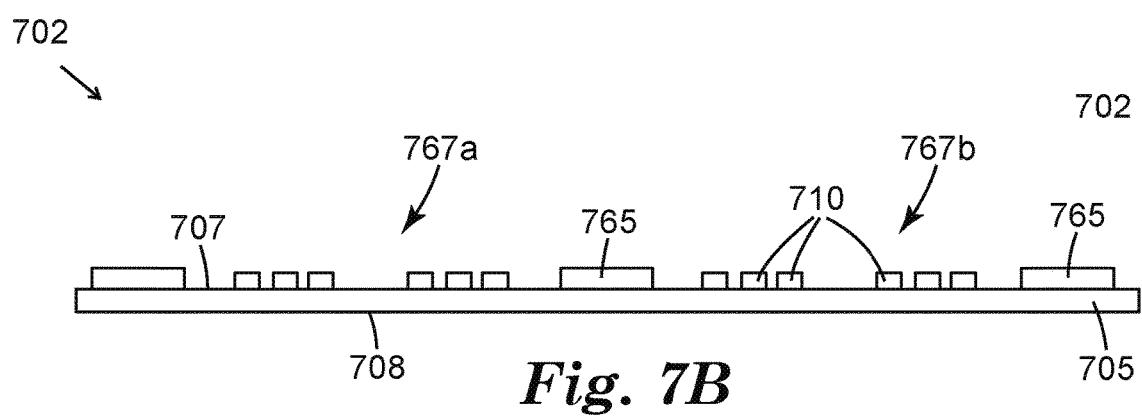
FIG. 7B is a schematic cross-sectional view of a portion of the film assembly of FIG. 7A.

FIG. 7B is a schematic illustration of a cross section through a portion of film assembly 702 showing two closed cells 767A and 767B separated by columns 765. Each closed cell 767A and 767B includes an antenna 710. Stretchable substrate 705 includes major top surface 707 and opposing major bottom surface 708.

The following is a list of exemplary embodiments of the present description.

Item 1. A radio frequency identification tag comprising:
  a flexible substrate having opposite major top and bottom surfaces;
  an antenna having a spiral form disposed on the top surface of the substrate and having a length between first and second ends;
  a first terminal disposed at and in electrical communication with the first end of the antenna;
  a second terminal disposed at and in electrical communication with the second end of the antenna; and
  a pad portion along the length of the antenna between the first and second ends for mounting an integrated circuit, the pad portion being in electrical communication with the antenna, such that except for the pad portion, a radius of curvature of the antenna along at least 90 percent of a length of the antenna between the first and second ends is greater than about 0.1 mm and less than about 10 mm.

Item 2. The radio frequency identification tag of item 1, wherein except for the pad portion, the radius of curvature of the antenna along at least 90 percent of the length of the antenna between the first and second ends is greater than about 0.1 mm and less than about 8 mm.

Item 3. The radio frequency identification tag of item 1, wherein except for the pad portion, the radius of curvature of the antenna along at least 90 percent of the length of the antenna between the first and second ends is greater than about 0.1 mm and less than about 6 mm.

Item 4. The radio frequency identification tag of item 1, wherein except for the pad portion, the radius of curvature of the antenna along at least 90 percent of the length of the antenna between the first and second ends is greater than about 0.1 mm and less than about 4 mm.

Item 5. The radio frequency identification tag of item 1, wherein except for the pad portion, the radius of curvature of the antenna along at least 90 percent of the length of the antenna between the first and second ends is greater than about 0.1 mm and less than about 3.5 mm.

Item 6. The radio frequency identification tag of item 1, wherein except for the pad portion, the radius of curvature of the antenna along at least 90 percent of the length of the antenna between the first and second ends is greater than about 0.12 mm and less than about 3.5 mm.

Item 7. The radio frequency identification tag of item 1, wherein except for the pad portion, the radius of curvature of the antenna along at least 95 percent of the length of the antenna between the first and second ends is greater than about 0.1 mm and less than about 8 mm.

Item 8. The radio frequency identification tag of item 1, wherein except for the pad portion, the radius of curvature of the antenna along substantially all of the length of the antenna between the first and second ends is greater than about 0.1 mm and less than about 8 mm.

Item 9. The radio frequency identification tag of item 1, wherein except for the pad portion, the radius of curvature of the antenna along substantially all of the length of the antenna between the first and second ends is greater than about 0.1 mm and less than about 4 mm.

Item 10. The radio frequency identification tag of item 1, wherein except for the pad portion, the radius of curvature of the antenna along substantially all of the length of the antenna between the first and second ends is greater than about 0.12 mm and less than about 3.5 mm.

Item 11. The radio frequency identification tag of item 1, wherein the flexible substrate comprises polyurethane.

Item 12. The radio frequency identification tag of item 1, wherein the flexible substrate is stretchable.

Item 13. The radio frequency identification tag of item 1, wherein the antenna comprises a plurality of substantially concentric loops comprising a plurality of middle loops disposed between an innermost loop and an outermost loop, wherein the radius of curvature of each middle loop along substantially an entire length of the middle loop is greater than about 0.1 mm and less than about 10 mm.

Item 14. A radio frequency identification tag comprising:
a flexible substrate, and
an antenna having a plurality of substantially concentric loops disposed on a major surface of the flexible substrate and forming a plurality of first zones and a plurality of second zones, each first zone comprising a plurality of concentric first arcs, each first arc in the plurality of first zones having a same first arc angle in a range from about 60 degrees to about 120 degrees, each second zone comprising a plurality of concentric second arcs, each second arc in the plurality of second zones having a same second arc angle in a range from about 160 degrees to about 200 degrees.

Item 15. The radio frequency identification tag of item 14, wherein a radius of curvature of each first and each second arc along substantially an entire length of the arc is in a range from about 1 mm to about 5 mm.

Item 16. The radio frequency identification tag of item 14, wherein an end of each arc in each zone in the pluralities of first and second zones is connected to an end of an arc in a different zone in the pluralities of first and second zones to form a combined arc, a radius of curvature of the combined arc along substantially all of an entire length of the combined arc being in a range from about 1 mm to about 5 mm.

Item 17. The radio frequency identification tag of item 14, wherein the first arc angle is about 90 degrees and the second arc angle is about 180 degrees.

Item 18. The radio frequency identification tag of item 14, wherein the antenna has a substantially polygonal shape having a plurality of vertices and sides, wherein each first zone is disposed along a side and each second zone is disposed at a vertex.

Item 19. The radio frequency identification tag of item 14, wherein the concentric first arcs in at least one first zone are concave toward an innermost loop in the plurality of substantially concentric loops, and the concentric first arcs in at least one other first zone are convex toward the innermost loop.

Item 20. The radio frequency identification tag of item 14, wherein the concentric second arcs in at least one second zone are concave toward an innermost loop in the plurality of substantially concentric loops.

Item 21. The radio frequency identification tag of item 14, wherein the concentric second arcs in each second zone are concave toward an innermost loop in the plurality of substantially concentric loops.

Item 22. The radio frequency identification tag of item 14, wherein an end of each arc in each second zone in the plurality of second zones is connected to an end of a first arc in a first zone in the plurality of first zones.

Item 23. A radio frequency identification tag comprising:
a flexible substrate, and
an antenna having a plurality of substantially concentric loops disposed on a major surface of the flexible substrate and comprising a plurality of middle loops between innermost and outermost loops, each middle loop comprising alternating concave and convex portions, wherein a radius of curvature along at least 90 percent of a length of the middle loop is in a range from about 0.1 mm to about 4 mm.

Item 24. The radio frequency identification tag of item 23, wherein the radius of curvature along substantially all of the length of the middle loop is in a range from about 0.1 mm to about 4 mm.

Item 25. A film assembly comprising:
a stretchable substrate having opposite major top and bottom surfaces;
a first material disposed on the major top surface of the stretchable substrate in the form of a plurality of intersecting rows and columns making the film assembly less stretchable than the stretchable substrate, the rows and columns defining a plurality of closed cells; and
an antenna for use in a radio frequency identification tag disposed on the stretchable substrate in each closed cell and isolated from the first material, the antenna comprising an elongated electrically conductive electrode having a spiral form.

Item 26. The film assembly of item 25, wherein the first material comprises metal.

Item 27. The film assembly of item 25, wherein the antenna comprises a plurality of substantially concentric loops disposed on the stretchable substrate and comprising a plurality of middle loops between innermost and outermost loops, each middle loop including alternating concave and convex portions, wherein a radius of curvature along at least 90 percent of a length of the middle loop is in a range from about 0.1 mm to about 4 mm.

Item 28. A multilayer stack comprising:
a first stretchable layer having a first length;
a first adhesive layer disposed on a top surface of the first stretchable layer and having the first length;
a second stretchable layer disposed on a top surface of the first adhesive layer and having a second length smaller than the first length;
a radio frequency identification tag comprising an antenna having a spiral form and disposed on a top surface of the second stretchable layer or on a bottom surface of the second stretchable layer;
a second adhesive layer disposed on the second stretchable layer and having a third length less than the first length and greater than the second length, the second adhesive layer encapsulating the second stretchable layer; and
a third stretchable layer disposed on a top surface of the second adhesive layer and having the third length.

Item 29. The multilayer stack of item 28, wherein each of the first and second adhesive layers comprises a pressure sensitive acrylate adhesive.

Item 30. The multilayer stack of item 28, wherein each of the first, second and third stretchable layers comprises polyurethane.

Item 31. The multilayer stack of item 28, wherein the antenna comprises a plurality of substantially concentric loops disposed on the top surface of the second stretchable layer and comprising a plurality of middle loops between innermost and outermost loops, each middle loop including alternating concave and convex portions, wherein a radius of curvature along at least 90 percent of a length of the middle loop is in a range from about 0.1 mm to about 4 mm.

Item 32. The multilayer stack of item 28, wherein the radio frequency identification tag is disposed on the top surface of the second stretchable layer and is encapsulated by the second adhesive layer.

Item 33. The multilayer stack of item 28, wherein the radio frequency identification tag is disposed on the bottom surface of the second stretchable layer and is encapsulated by the first adhesive layer.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof

What is claimed is:

1. A multilayer stack comprising:
    a first stretchable layer having a first length;
a first adhesive layer disposed on a top surface of the first stretchable layer and having the first length;
    a second stretchable layer disposed on a top surface of the first adhesive layer and having a second length smaller than the first length;
    a radio frequency identification tag comprising an antenna having a spiral form and disposed on a top surface of the second stretchable layer or on a bottom surface of the second stretchable layer;
    a second adhesive layer disposed on the second stretchable layer and having a third length less than the first length and greater than the second length, the second adhesive layer encapsulating the second stretchable layer; and
    a third stretchable layer disposed on a top surface of the second adhesive layer and having the third length, wherein the antenna comprises a plurality of substantially concentric loops comprising a plurality of middle loops between innermost and outermost loops, each middle loop including alternating concave and convex portions, and wherein a radius of curvature along at least 90 percent of a length of the middle loop is in a range from about 0.1 mm to about 4 mm.

2. The multilayer stack of claim 1, wherein each of the first and second adhesive layers comprises a pressure sensitive acrylate adhesive.

3. The multilayer stack of claim 1, wherein each of the first, second and third stretchable layers comprises polyurethane.

4. The multilayer stack of claim 1, wherein the radio frequency identification tag is disposed on the top surface of the second stretchable layer and is encapsulated by the second adhesive layer.

5. The multilayer stack of claim 1, wherein the radio frequency identification tag is disposed on the bottom surface of the second stretchable layer and is encapsulated by the first adhesive layer.

6. A multilayer stack comprising:
    a first stretchable layer having a first length;
a first adhesive layer disposed on a top surface of the first stretchable layer and having the first length;
    a second stretchable layer disposed on a top surface of the first adhesive layer and having a second length smaller than the first length;
    a radio frequency identification tag comprising an antenna having a spiral form and disposed on a top surface of the second stretchable layer or on a bottom surface of the second stretchable layer;
    a second adhesive layer disposed on the second stretchable layer and having a third length less than the first length and greater than the second length, the second adhesive layer encapsulating the second stretchable layer; and
    a third stretchable layer disposed on a top surface of the second adhesive layer and having the third length, wherein the antenna comprises a plurality of substantially concentric loops forming a plurality of first zones and a plurality of second zones, each first zone comprising a plurality of concentric first arcs, each first arc in the plurality of first zones having a same first arc angle in a range from about 60 degrees to about 120 degrees, each second zone comprising a plurality of concentric second arcs, each second arc in the plurality of second zones having a same second arc angle in a range from about 160 degrees to about 200 degrees.

7. The multilayer stack of claim 6, wherein each of the first and second adhesive layers comprises a pressure sensitive acrylate adhesive.

8. The multilayer stack of claim 6, wherein each of the first, second and third stretchable layers comprises polyurethane.

9. The multilayer stack of claim 6, wherein the radio frequency identification tag is disposed on the top surface of the second stretchable layer and is encapsulated by the second adhesive layer.

10. The multilayer stack of claim 6, wherein the radio frequency identification tag is disposed on the bottom surface of the second stretchable layer and is encapsulated by the first adhesive layer.

* * * * *